C. F. REMINGTON.
MEANS FOR TRIMMING BURS FROM THE CUT ENDS OF PRINTERS' RULES.
APPLICATION FILED FEB. 10, 1908.
1,025,308.
Patented May 7, 1912.
4 SHEETS—SHEET 2.
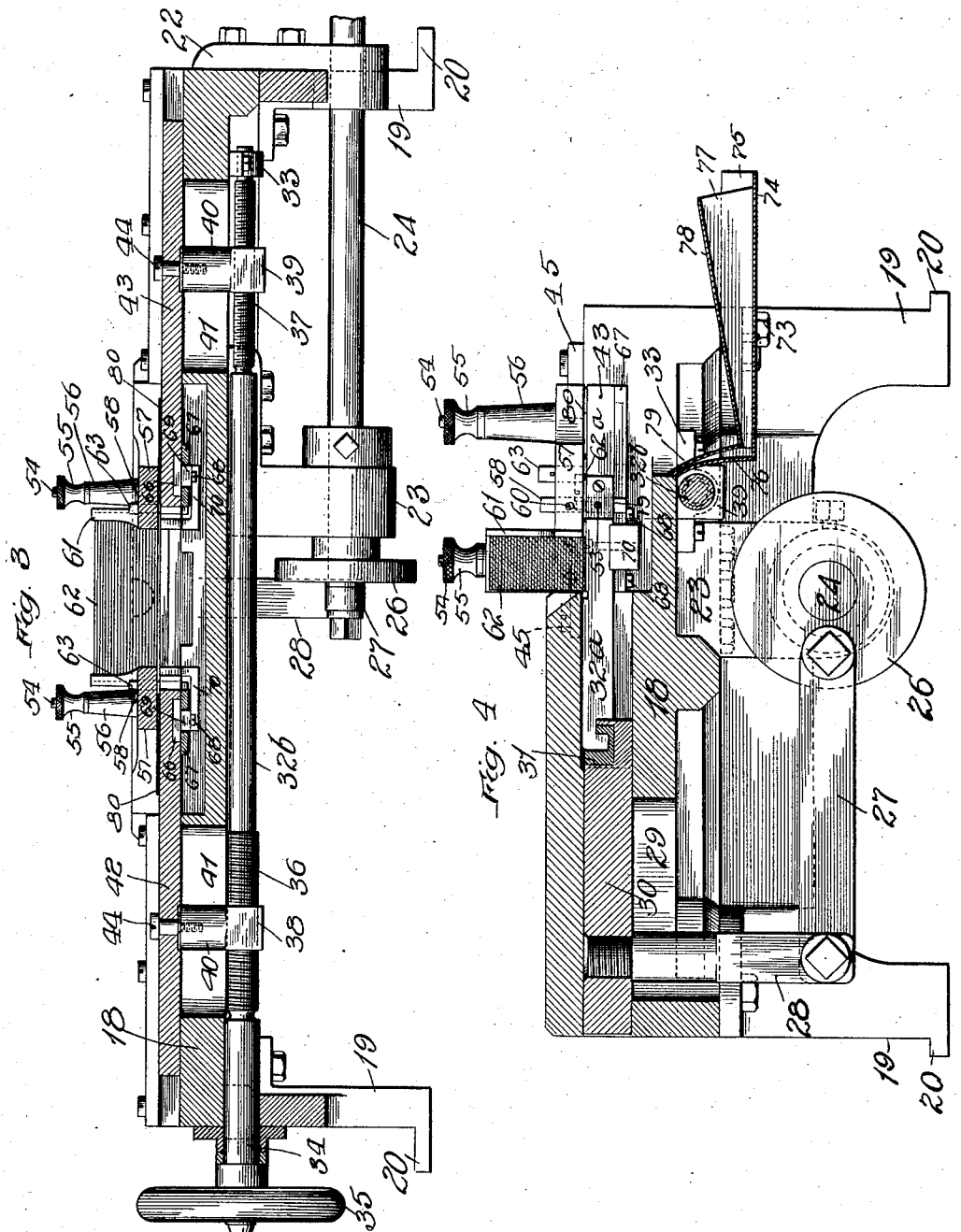

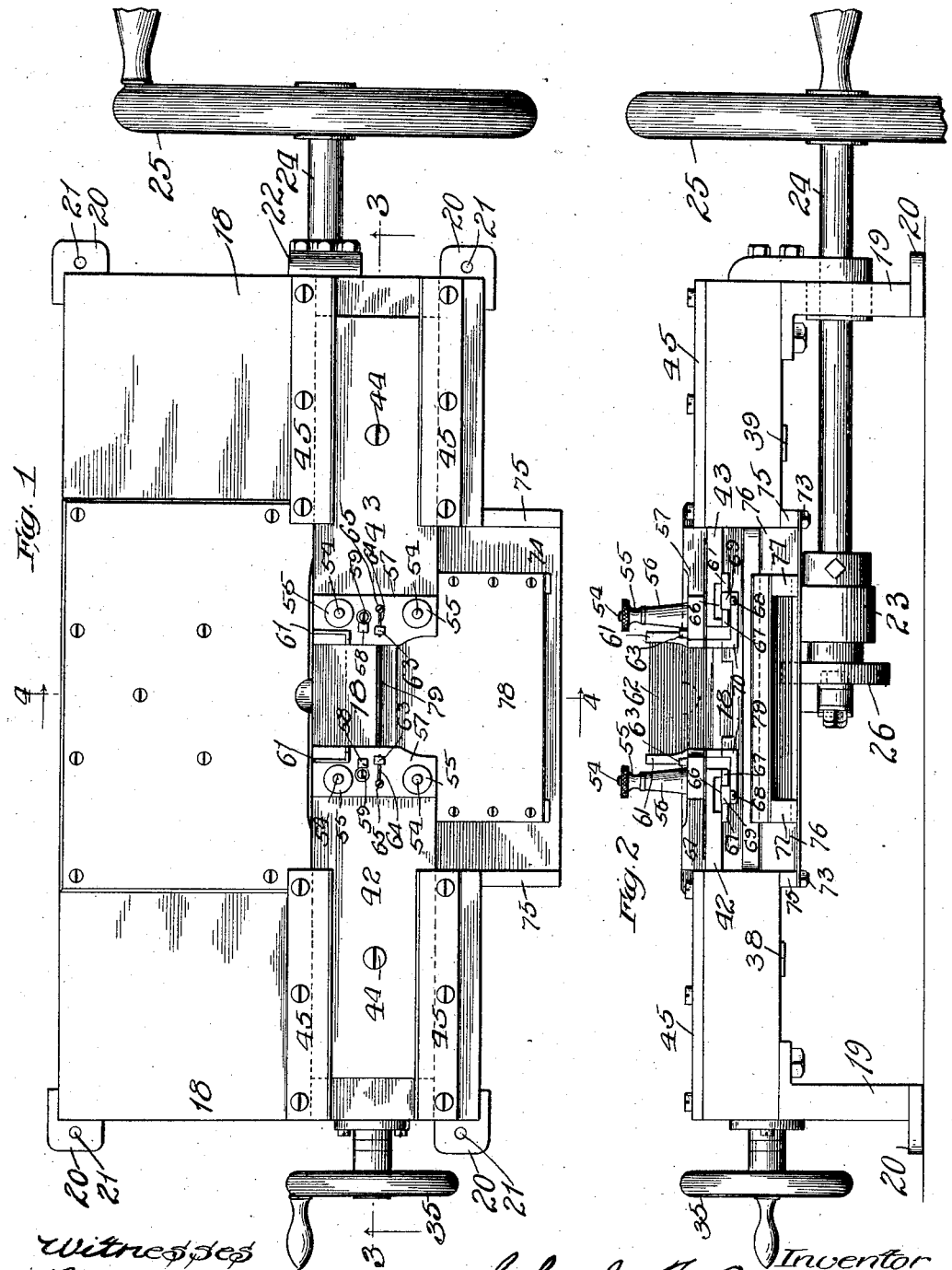

C. F. REMINGTON.
MEANS FOR TRIMMING BURS FROM THE CUT ENDS OF PRINTERS' RULES.
APPLICATION FILED FEB. 10, 1908.
1,025,308.
Patented May 7, 1912.
4 SHEETS—SHEET 3.
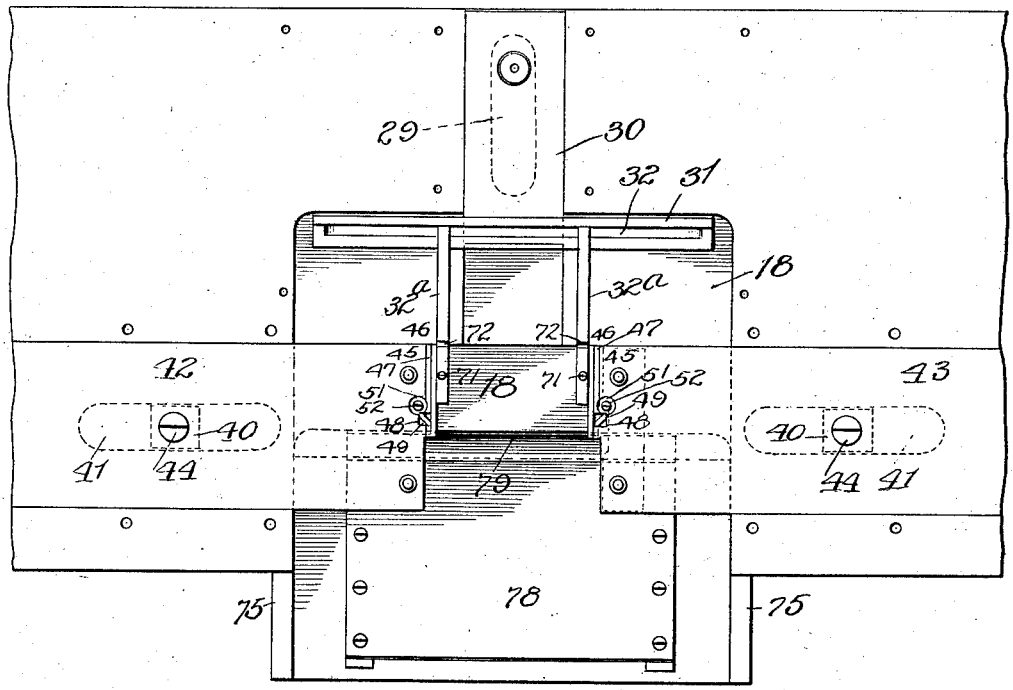
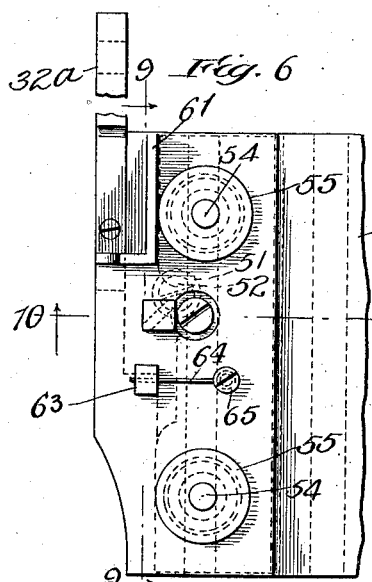
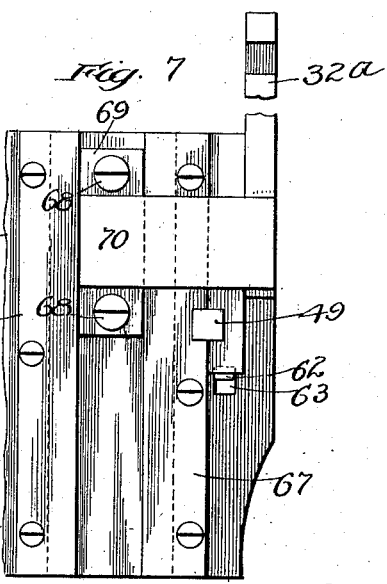

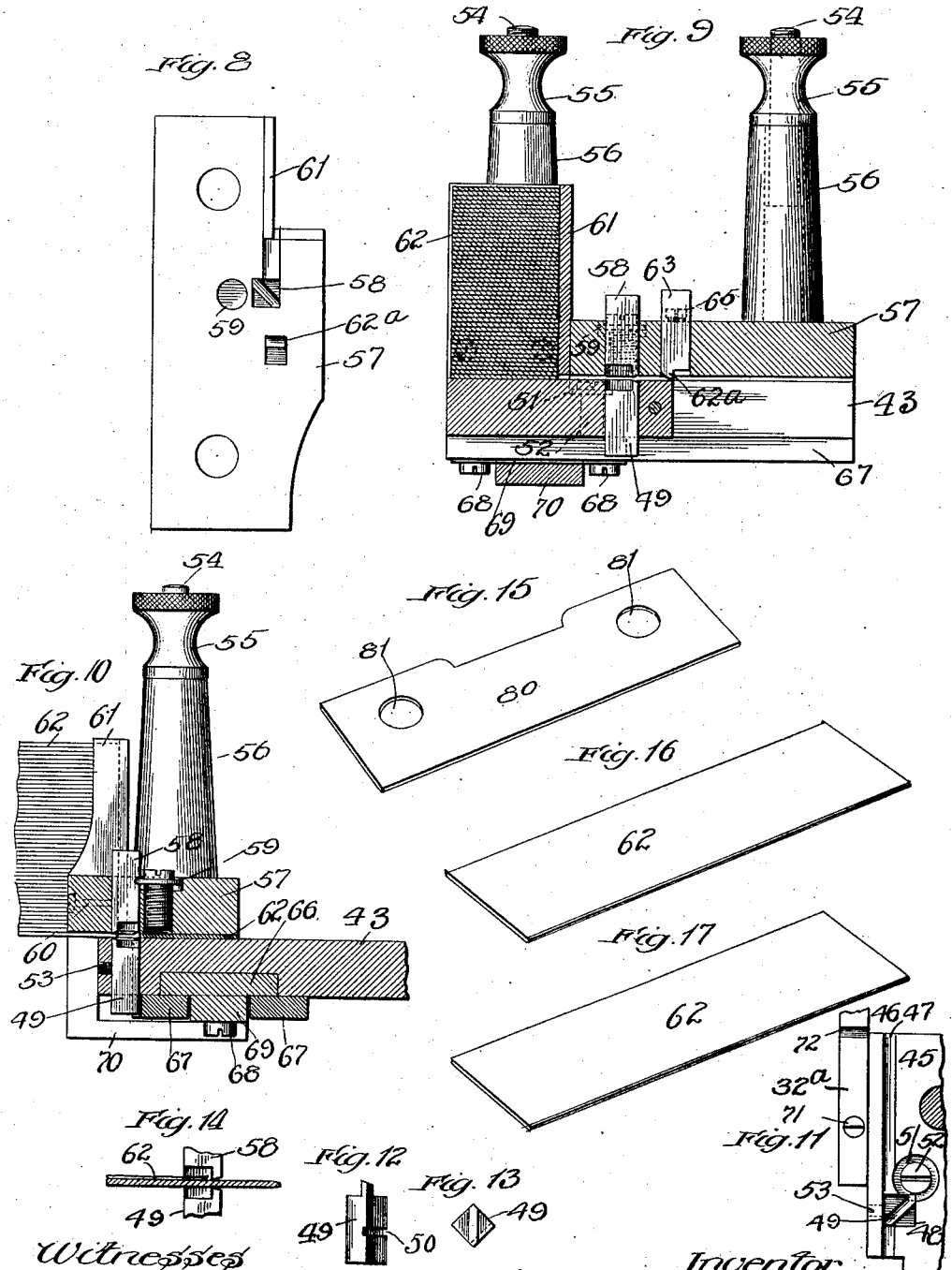

UNITED STATES PATENT OFFICE.

CHARLES F. REMINGTON, OF CHICAGO, ILLINOIS, ASSIGNOR TO THE AMERICAN TYPE FOUNDERS COMPANY, OF JERSEY CITY, NEW JERSEY, A CORPORATION OF NEW JERSEY.

MEANS FOR TRIMMING BURS FROM THE CUT ENDS OF PRINTERS' RULES.

1,025,308. Specification of Letters Patent. Patented May 7, 1912.

Application filed February 10, 1908. Serial No. 415,126.

*To all whom it may concern:*

Be it known that I, CHARLES F. REMINGTON, a citizen of the United States, and a resident of Chicago, in the county of Cook and State of Illinois, have invented certain new and useful Improvements in Means for Trimming Burs from the Cut Ends of Printers' Rules, of which the following is a full, clear, and exact specification.

This invention relates to improvements in means for trimming burs from the cut ends of printers' rules, which trimming has heretofore been confined to a manual operation, consisting in rubbing the rule against a cutting surface, consisting of emery or sandpaper or other gritty substance while holding the rules in the hand, and which at best is unsatisfactory for the purposes of perfect rules, because of the difficulty in determining how hard and how long to rub them in order to cut away the rough edges, *i. e.*, the bur produced by and necessarily following the sawing of metal and particularly brass rules in lengths.

The prime object of my invention is to remove the bur from sawed printers' rules by an operation entirely mechanical, and by the employment of metal-cutting blades, and in so doing remove the bur without substantially or perceptibly removing any of the body portion of the rule.

A further object of my invention is to provide means by which printers' rules, varying in length, are automatically fed past the trimming devices, and discharged from guides directing them in their movements past the cutters, and to simultaneously trim both ends of a rule.

Another object of my invention is to provide means whereby the guiding devices for the rules in their passage past the cutters may be accurately and with certainty adjusted to rules of any thickness.

A further object of my invention is to conduct the rules past the cutters by a force uniformly applied against and throughout the length of an edge of the rule, and thereby prevent any possibility of the rules wedging in their guide.

A still further object of my invention is to mechanically trim the burs from sawed ends of rules by a mechanical structure, the driving shaft of which may be actuated either by hand or by power and in which provision is made for stacking the rules, one upon the other, automatically, consecutively directing them past the trimming devices, and discharging them from the machine in a stacked pile, and without the possibility of the rules coming in contact with the cutting blades after they are trimmed.

With these ends in view, my invention consists in certain features of novelty in the construction, combination and arrangement of parts, by which the said objects and certain other objects hereinafter appearing are attained, all as fully described with reference to the accompanying drawings, and more particularly pointed out in the claims.

In said drawings: Figure 1 represents a top plan view of a rule-trimming machine embodying my invention. Fig. 2, a rear side elevation thereof. Fig. 3, a vertical longitudinal section of the same on the line 3—3 of Fig. 1. Fig. 4, a vertical transverse section on the line 4—4 of Fig. 1. Fig. 5, a top plan view, in which the cover for the feed-bar and the upper cutter-bars are removed. Fig. 6, an enlarged detail top plan view of one of the upper cutter-bars. Fig. 7, an enlarged detail bottom plan view of the lower cutter-bar and the feed-bar therefor. Fig. 8, a bottom plan view of the upper cutter-bar. Fig. 9, an enlarged transverse section through one of the upper cutter-bar structures on the line 4—4 of Fig. 1, showing the rules stacked in their feeding position, the opposing cutters and the yielding discharger. Fig. 10, an enlarged view on the line 10—10 of Fig. 6. Fig. 11, an enlarged detail top plan view of one of the cutting structures and feed devices. Fig. 12, a side elevation of one of the cutters detached, showing the groove therein engaged by the flange of the adjusting screw. Fig. 13, an end view of one of the cutters detached. Fig. 14, a detail cross section through an upper cutting-bar, and the base therefor, with a pattern rule in its operative position between the upper cutter-bar and the face of the sliding feed-bar. Fig. 15, a perspective view of a pattern rule. Fig. 16, a similar view of one of the rules before it is trimmed. Fig. 17, a similar view of one of the rules after it is trimmed by a trimming machine containing my invention.

Similar characters of reference indicate the same parts in the several figures of the drawing.

18 is an approximately rectangular bed-plate supported at its corners by legs, 19, having lateral flanges, 20, provided with suitable openings, 21, whereby the bed-plates may be secured to a suitable bench or support.

Depending from one end of the bed-plate are brackets, 22 and 23, in which is journaled the power-shaft, 24, of the machine, having on its outer end a hand crank-wheel, 25, but which may be a belt-wheel connected with some suitable source of power not shown.

On the inner end of the power-shaft, 24, is a crank-wheel, 26, to which is pivoted at one end a link, 27, the other end of which is pivoted to a post, 28, projected upwardly through a slot, 29, in the bed-plate, and screwed into a feed-bar, the stem, 30, and cross-head, 31, of which are countersunk in the bed-plate, and the cross-head connected with the stem (see Fig. 4) by recessing it therein, and at which point the cross-head is provided longitudinally with a groove, 32, (see Fig. 5) for the lateral adjustment of the pusher bars, $32^a$—$32^a$, hereinafter described, simultaneously to cutter-bars for rules varying in length.

In a plane between the power-shaft and the bed-plate is a shaft, $32^b$, journaled at its free end in a hanger, 33, and projecting through the legs of the machine, is journaled at its outer end in a box, 34, and provided with a crank-wheel, 35, for its operation.

The shaft, $32^b$, is provided toward its opposite ends with right and left-hand screw-threads, 36 and 37, working respectively in nuts, 38 and 39, having stems, 40—40, projecting through bed-plate openings, 41—41, respectively secured to opposing cutter-bars, 42 and 43, by means of screws, 44—44, passing through the cutter-bars into their respective stem-nuts, and whereby the cutter-bars are moved toward and away from each other, said bars being guided in their movement by plates, 45, screwed to the bedplate and projecting over the side edges of the cutter-bars, the length of the elongated slots, 41—41, in the bed-plate determining the length of movement of the cutter-bars, and lateral adjustment of the rule-holding and cutting devices.

Secured by means of ordinary set-screws to the opposing inner ends of the cutter-bars are (see Fig. 11) plates 46 and 47, and formed in the plate 47 and the cutter-bars is a recess, 48, in which is confined under cutters, 49, 49, the cutting edges of which extend at an oblique angle to the length of the cutter-bars and therefore likewise to the length of the rules to be cut, the shanks of said cutters (see Fig. 12) being provided with a slot 50, in which project the flanges, 51, 51, of adjusting screws, 52, 52, the raising and lowering of which flanged screws regulate the vertical adjustment of the respective cutters and plates 46 and 47, the screw 52 being countersunk in the bed-plate sufficiently to maintain the head of the screw below the plane of the bed-plate when adjusted to the limit of its upward movement and from contact with the upper cutter-heads, presently to be described, the cutting blades being locked in their adjustment by a set-screw, 53, (see Figs. 10 and 11) projected through the plate, 46.

Secured to and rising from each sliding cutter-bar are posts, 54—54, the upper ends of which posts are screw-threaded for thumb-nuts, 55—55, impinging against the upper ends of tubes, 56—56, sleeved upon the posts (as indicated by dotted lines in Fig. 9) and having an end bearing down against opposing upper cutter-heads, 57, respectively resting upon the opposing cutter-bars, the cutter-heads being provided with perforations whereby they are removably secured by the posts against movement in any direction and held rigidly upon the cutter-bars, as above described.

The upper cutter-heads are provided with cutters, 58, similar in construction and arrangement to the lower cutters, and like the lower cutters are adjusted vertically by means of flanged screws, 59, projected in the slots of their shanks, which screw however need not be countersunk below the upper surface of their respective heads, for the reason that there is no surface opposing it, and these upper cutters are also locked in their vertical adjustment by a set-screw, 60, (see Fig. 10) in the same manner as the lower cutter-heads. Toward their forward ends the upper cutter-heads are provided with an angular recess, in which, and rising above the plane of the cutter-heads, are corresponding angular plates, 61, in which may be stacked a number of rules, 62, (see Fig. 9) and with the result that they may be automatically consecutively fed by gravity in position to be carried past the cutters by the feed-bar. The upper cutter-head also sustains a stop, $62^a$, (see Fig. 9) the shank, 63, of which is angular in cross-section and confined by a corresponding perforation in the cutter-head in which it is free to slide vertically, the stop being normally projected below the plane of the bottom of the cutter-head by means of a spring, 64, (see Figs. 6 and 9) one end of which is clamped to the cutter-head by a screw, 65, and the other end projected through a perforation in the shank, 63, the stop, $62^a$, (see Fig. 9) being rounded on its front side and with an angular face at its rear side, so that when a rule is pushed past the stop it will immediately yield and rise to the pressure of the rule, but the moment the rule passes beyond its straight edge will descend to the position shown in Fig. 9, and prevent the movement in a reverse direction through its impingement against the straight side of the stop, the vertical movement of the stop being sufficient to adapt it for rules varying substantially in thickness.

The undersides of both cutter-bars are grooved (see Figs. 7 and 10) to a depth corresponding with the thickness of a slide-bar, 66—66, confined in their respective grooves by plates, 67—67, secured to the cutter-bars and projecting over the edges of the slide-bars, 66, upon the underside of which slide bars are secured, by one or more set-screws, 68, lugs, 69, 69, having respectively formed therewith brackets, 70, 70, projecting beyond the extreme opposing ends of the cutter-bars, to which brackets are secured the feed-bars, 32ª, by means of set-screws, 71, (see Fig. 11) cut away to form shoulders, 72, 72, (see Figs. 5 and 11) adapted to engage the edges of the rules, and by the forward movement of the feed bars, push the rules past the cutters.

Bolted to the under and outer edge of the frame of the machine, (see Figs. 2, 4 and 5), by bolts 73, 73, is an apron 74, provided with opposing side flanges 75, 75, through which the bolts pass into the frame, the outer end of the frame being open, and its inner end closed by a flange 76 projecting upwardly against the edge of the bed plate 18, said frame providing a support for a removable rule receiving pan 78 inclined downwardly from its outer toward its inner end supported by flanges or legs 77 resting on the apron 74 from the inner end of which pan 78 projects a flange 79 against the edge of the bed plate, 18, and in close proximity to the flange 76 of the apron 74. The incline of said flange 79 and of the plate 78 is such, that the trimmed rules discharged from their pusher bars 32ª will pile one upon the other in numbers forming stacks of substantial height, yet so stacked as not to topple over when removing the pan from the machine and the stacks from the pan to a table and thereby effect a substantial saving in time in handling and packing for shipment the printed rules.

In operation, when a number of rules of the same length are to be trimmed one of such rules is placed upon the pusher bars and then by manipulating the hand wheel 35, the sliding cutter bars 43 are moved toward each other until against the opposite ends of the rule, but not too tightly to prevent free passage of the rules to operative engagement with the cutters.

After the machine is thus properly adjusted to the length of the rule to be trimmed the thumb nuts 55 and tubes 56 are removed from the standards 54 and of the same length and also thickness and a pattern rule 80, (see Fig. 15), of the same length and also thickness is then slipped upon the edge of the standards 54, 54 by means of perforations 81, 81 therein for that purpose, after which the tubes 56 are returned to their operative position and the nuts 55 tightened thereon until the pattern rule is firmly clamped between the bed plate and the sliding cutter bars, and the cutters thereby adjusted for subsequently trimming the rules to uniform thickness.

If other rules of the same length either thinner or thicker than those for which the machine has now been fully adjusted are to be trimmed it is then only necessary to remove the pattern rule 80 and substitute one to correspond in thickness. After the machine has thus been properly adjusted to length and thickness of the rules to be trimmed they are piled in their guides or chutes, as shown in Figs. 3, 4 and 9, in such a position that on actuating the shaft 24 the pusher bars 32ª will push one rule at a time in operative engagement with and past the cutters, which rule in the withdrawing of the pusher bars to the normal position is prevented from following it by the stop 63, and as the pusher bars recede drops into the removable pan wherein the successively discharged rules pile in such a manner as to touch against the flange 79 of the pan and against the toppling forwardly over from their piled position.

By the time the presser bars have moved to the limit of their backward stroke their rollers 72 have passed clear of the bed plate of the rules the result being that by gravity the adjacent rule drops upon the feed bar in position to be fed forwardly past the cutters as already described and thereby the piled rule is successively trimmed on both edges at each downward stroke of the pusher bars, and in any bars that may be placed in the feed chutes for the rules.

In the practical operation of the machine herein shown and described as the mechanical embodiment of my invention many thousand rules may not only be trimmed of their burs simultaneously at both ends in the course of a few hours, and the burs are not only quickly and entirely removed from the rules, but this without cutting into the body thereof, and whereby the ends of the rules are not reduced in thickness nor even visibly marred. On the other hand, when the common practice is followed of rubbing the rule with or against emery paper it is practically impossible to entirely remove the burs without scratching or otherwise defacing the surface of the rules to a considerable distance inwardly from both cut ends, and therefore beveling the surface of rules more or less adjacent their lower edge, and to a degree rendering them objectionably inaccurate in use. Again when at best the bur is removed from the surfaces of the rule by present hand manipulation there will still be burs projecting from the ends of the rules, prevented by my invention for the reason that the ends of the rules so closely fit between the ends of the sliding cutter bars that none of the bars can be bent downwardly over these ends or out of the path of the cutters, for when a proper adjustment, easily and quickly made, of the sliding cutter bars, it is impossible for any of the burs to escape removal by the cutters, and this without any liability to mar the rules.
In Fig. 16 is illustrated as nearly as may be an untrimmed rule, i. e. a course set rule with the burs still adhering thereto, and in Fig. 17 is the same rule after it is trimmed, and in which every surface including its edges are perfectly smooth, the corners of the under edges being as smooth as the previously finished side edges.

While the oblique arrangement of the cutter knives relative to the path of movement of the rule is preferable for the purposes of a shear and smooth cut of the burs from the rule as is possible, my invention includes any other arrangement of the cutters by which it is possible to remove the burs without seriously injuring or marring a printer's rule.

My invention is therefore not limited to any particular form or direction of movement the cutter may have relative to the rules to be operated upon, nor is it limited to the special form of the pusher bars, the means for actuating them, the form and operation of the stop, for my invention includes any mechanically actuated means by which rules may be fed to and past cutters operating to remove the burs therefrom without defacing or otherwise injuring the rule; nor is it limited to any other details of construction, in view of the fact that I am not aware of any machine for trimming burs off printers' cut rules, or which is adapted to entirely remove burs from cut ends, in the absence of hand manipulating operation, or by abrasion, as distinguished from cutting knives.

Now having described my invention what I claim as new and desire to secure by Letters Patent is:—

1. A rule-bur trimming machine comprising in combination upper and lower cutting blades in pairs, arranged at opposite sides of the path of travel of the rule to be trimmed, a pusher bar for moving the rule to contact with all of said blades, and means for actuating said bar whereby the burs are trimmed simultaneously from the four longitudinal corners of the rule, substantially as described.

2. A rule-bur trimming machine comprising in combination upper and lower cutting blades in pairs, arranged at opposite sides of the path of travel of the rule to be trimmed, means for adjusting said blades to differing thicknesses of rules, a pusher bar for moving the rule to contact with said blades, and means for actuating said bar, substantially as described.

3. A rule-bur trimming machine comprising in combination upper and lower cutting blades in pairs, arranged at opposite sides of the path of travel of the rule to be trimmed, a pusher bar for moving the rule to contact with all of said blades, means for actuating said bar, the cutting edges of which blades are arranged at an oblique angle to the path of movement of said bar, substantially as described.

4. A rule-bur trimming machine comprising in combination upper and lower cutting blades in pairs, arranged at opposite sides of the path of travel of the rule to be trimmed, a pusher bar for moving the rule to simultaneously contact with said blades, means for actuating the bar, and shoulders upon said bar adapted to engage the edge of the rules and push them past the cutting blades, substantially as described.

5. A rule-bur trimming machine comprising in combination upper and lower cutting blades in pairs, arranged at opposite sides of the path of travel of the rule to be trimmed, a pusher bar for moving the rule to contact with said blades, means for actuating said bar, and a sliding stop maintaining the said rules from a backward movement with the pusher bar, substantially as described.

6. A rule-bur trimming machine comprising in combination upper and lower cutting blades at opposite sides of the path of travel of the rule to be trimmed, a pusher bar for moving the rule simultaneously to contact with all of said blades, means for actuating said bar, and a sliding stop automatically operating to prevent a backward movement of the rules, substantially as described.

7. A rule-bur trimming machine comprising in combination upper and lower cutting blades, arranged at opposite sides of the path of travel of the rule to be trimmed, a pusher bar for moving the rule to simultaneously contact with all of said blades, means for actuating said pusher bar, and a spring actuated sliding stop forward of the cutters preventing a backward movement of the rules with the pusher bar on its return movement, substantially as described.

8. A rule-bur trimming machine comprising in combination upper and lower cutting blades in pairs, arranged at opposite sides of the path of travel and in contact with the four longitudinal corners of the rule to be trimmed, a pusher bar for moving the rule to contact with said blades, means for actuating said bar, and means for separately adjusting the blades of each pair to differing thicknesses of rules to be trimmed, substantially as described.

9. A rule-bur trimming machine comprising in combination upper and lower fixed cutting blades in pairs, arranged at opposite sides of the path of travel of the rule to be trimmed, means for adjusting said cutting blades to rules differing in length, a pusher bar for moving the rule to contact with said blades, and means for actuating said bar, substantially as described.

10. A rule-bur trimming machine comprising in combination upper and lower cutting blades, arranged at opposite sides of the path of travel of the rule to be trimmed, means for adjusting said blades to rules differing in length, means for adjusting said blades to rules differing in thickness, a pusher bar, and means for actuating said bar to force said rules between and past said cutting blades, substantially as described.

11. A rule-bur trimming machine comprising in combination upper and lower cutting blades respectively arranged at opposite sides of the path of travel of the rule to be trimmed, with their cutting edges at an oblique angle to the forward movement of the rule, a pusher bar, means for actuating said bar to force both ends of said rule simultaneously between and in contact with said cutters, whereby the burs from both ends and edges of the rule are removed therefrom during a single forward movement of said rule, and means for preventing a backward movement of the rule during its advance between the cutters, substantially as described.

12. A rule-bur trimming machine comprising in combination upper and lower cutting blades in pairs, arranged at opposite sides of the path of travel and to contact with the rules to be trimmed, the edges of which cutters are at an oblique angle with reference to the path of movement of the rule, means for adjusting the depth of cut and length for a further adjusted position, means for shifting said cutters to remove burs from rules of different length and thickness, a pusher bar, means for actuating said bar to push the rule to engage it with and past said cutters, a stop preventing the backward movement and contact to the rule with the cutters after being trimmed, and whereby the trimmed rule may be discharged past the cutting blades, substantially as described.

13. A rule-bur trimming machine comprising in combination adjustable upper and lower cutting blades in pairs, arranged at opposite sides of the path of travel of the rule to be trimmed, and their cutting edges at an oblique angle with reference to the line of forward movement of the rules to be trimmed, means for adjusting the depth and length of cut of the cutting blades for another adjusted position, means for shifting said cutters to remove burs from rules of differing lengths and thicknesses, a pusher bar, means for actuating said bar to be trimmed to engagement with and past said cutters, and an automatically operating stop preventing the backward movement and contact of the rules with the cutters as they are being trimmed, and whereby the rules are discharged by gravity away from the cutters, substantially as described.

14. A rule-bur trimming machine comprising in combination upper and lower fixed cutting blades in pairs, arranged at opposite sides of the path of travel of the rule to be trimmed, means whereby the rules to be trimmed may be stacked one above the other, a pusher bar adapted to engage but one and the bottom rule of said stack at each forward stroke, means for actuating said bar, and a stop forward of said blades automatically preventing a backward movement of the rule after it is trimmed, and whereby the rule will fall by gravity away from the cutters successively to a piled position, substantially as described.

15. A rule-bur trimming machine comprising in combination opposing lower cutter bars, means for moving said bars laterally and away from each other; fixed cutting blades secured thereto, upper cutter bars respectively mounted on the lower cutter bars, cutting blades secured to said upper cutter bars said blades being arranged to engage and trim the burs from the longitudinal corners of a rule, and means by which a pattern rule of the thickness of the rule to be trimmed may be confined between said upper and lower cutter bars, and whereby the opposing cutter bars are adjusted to uniformly trim the burs from rules of the thickness of the pattern rule, substantially as described.

16. A rule-bur trimming machine comprising in combination upper and lower cutting blades in pairs, arranged at opposite sides of the path of travel of the rule to be trimmed, opposing lower cutter bars laterally adjustable toward and from each other, and to which the lower cutting blades are secured, fixed posts supported by said cutter bars and to which the upper cutting blades are secured with their cutting edges projecting below the under surface of said posts, and means for securing said upper cutter bars to said posts, whereby a pattern rule interposed between the upper and under cutter bars serve to adjust the cutters to successively trim rules of a thickness corresponding with that of the pattern rules, substantially as described.

17. A rule-bur trimming machine comprising in combination upper and lower cutting blades in pairs, arranged at opposite sides of the path of travel of the rule to be trimmed, reciprocating feed bars therefor, pusher bars supported by said feed bars, means whereby said pusher bars are adjustable with reference to rules differing in length, and means for actuating said pusher bars, substantially as described.

18. A rule-bur trimming machine comprising in combination opposing sliding cutter bars, under cutters secured thereto, means for simultaneously adjusting said bars and cutters from and toward each other to rules differing in length, pusher bars confined and slidable in said cutter bars, means for actuating said pusher bars, and means whereby the pusher bars may be moved toward and from each other in adjusting the sliding cutter bars, substantially as described.

19. A rule-bur trimming machine comprising in combination upper and lower cutting blades arranged in pairs, and simultaneously engaging and trimming burs from the several corners of a rule, reciprocating pusher bars, a power shaft, and means connecting said bars and shaft, substantially as described.

20. A rule-bur trimming machine comprising in combination upper and lower fixed cutting blades in pairs for simultaneously engaging and trimming all the burs from a rule, means whereby the rules may be stacked one upon another forward of said cutting blades with the under rule in a plane with the opposing edges of the cutting blades, pusher bars for pushing the stacked rules one at a time between the edges of said blades, an immovable stop preventing the backward movement of the rules, a power shaft, and means connecting said shaft with the pusher bars whereby the pusher bars are continuously actuated and the rules successively trimmed, substantially as described.

21. A rule-bur trimming machine comprising in combination upper and lower cutting blades arranged in pairs for simultaneously engaging and trimming burs from the four corners of the rule, a crank shaft, a pusher structure consisting of a slotted stem, a recessed crosshead and pusher bars laterally adjustable in said cross-heads, and a link connection between the pusher structure and said crank shaft, substantially as described.

22. A rule-bur trimming machine comprising in combination laterally adjustable pusher bars, a power shaft, and means connecting the power shaft with the pusher bars for actuating the same, a hopper arranged above the pusher bars from which the stacked rules are discharged one at a time by the pusher bar, opposing upper and lower cutting blades in the path of movement of rules discharged from the hopper, a removable rule receptacle to which the trimmed rules deposit by gravity, and means whereby the rules automatically stack therein, substantially as described.

23. A rule-bur trimming machine comprising in combination opposing adjustable cutter bars in pairs mounted one upon the other, reciprocating pusher bars, a sliding connection between said pusher bars and the lower cutter bars, a crosshead supporting said pusher bars provided for their lateral adjustment simultaneously with the adjustment of the cutter bars, and means for actuating the pusher bars, substantially as described.

24. A rule-bur trimming machine comprising in combination sliding cutter bars, upper and lower cutting blades arranged in opposing pairs supported by and removable from said cutter bars, a crosshead, pusher bars laterally adjustable in said crosshead, a sliding bar recessed in the under side bar, and means connecting said sliding bars with the pusher bars, substantially as described.

In witness whereof, I have hereunto set my hand and affixed my seal, this tenth day of December A. D. 1907.

CHARLES F. REMINGTON. [L. S.]

Witnesses:
    JNO. G. ELLIOTT,
    IDA CROSS.

---

Copies of this patent may be obtained for five cents each, by addressing the "Commissioner of Patents, Washington, D. C."